(12) United States Patent
Gutierrez et al.

(10) Patent No.: US 6,598,455 B1
(45) Date of Patent: Jul. 29, 2003

(54) NON-INERTIAL CALIBRATION OF VIBRATORY GYROSCOPES

(75) Inventors: Roman C. Gutierrez, La Crescenta, CA (US); Tony K. Tang, Glendale, CA (US)

(73) Assignee: California Institute of Technology, Pasadena, CA (US)

( * ) Notice: Subject to any disclaimer, the term of this patent is extended or adjusted under 35 U.S.C. 154(b) by 151 days.

(21) Appl. No.: 09/608,994

(22) Filed: Jun. 30, 2000

Related U.S. Application Data

(60) Provisional application No. 60/141,918, filed on Jun. 30, 1999.

(51) Int. Cl.[7] .............................................. H04B 7/185
(52) U.S. Cl. ...................................................... 73/1.77
(58) Field of Search .............................. 73/1.77; 702/92, 702/94

(56) References Cited

U.S. PATENT DOCUMENTS

| | | | | |
|---|---|---|---|---|
| 3,782,167 A | * | 1/1974 | Stuelpnagel | 73/1.77 |
| 5,301,114 A | * | 4/1994 | Mitchell | 73/1.77 |
| 6,209,383 B1 | * | 4/2001 | Mueller et al. | 73/1.77 |

* cited by examiner

*Primary Examiner*—Robert Raevis
(74) *Attorney, Agent, or Firm*—Fish & Richardson P.C.

(57) ABSTRACT

The electrostatic elements already present in a vibratory gyroscope are used to simulate the Coriolis forces. An artificial electrostatic rotation signal is added to the closed-loop force rebalance system. Because the Coriolis force is at the same frequency as the artificial electrostatic force, the simulated force may be introduced into the system to perform an inertial test on MEMS vibratory gyroscopes without the use of a rotation table.

18 Claims, 2 Drawing Sheets

NON-INERTIAL CALIBRATION OF VIBRATORY GYROSCOPES

CROSS-REFERENCE TO RELATED APPLICATIONS

This application claims benefit of U.S. Provisional Application No. 60/141,918, filed Jun. 30, 1999.

ORIGIN OF INVENTION

The invention described herein was made in the performance of work under a NASA contract, and is subject to the provisions of Public Law 96-517 (35 U.S.C. §202) in which the Contractor has elected to retain title.

TECHNICAL FIELD

This invention relates to vibratory gyroscopes, and more particularly to silicon micromachined vibratory gyroscopes.

BACKGROUND

Multi-axis sensors are highly desirable for inertial sensing of motion in three dimensions. Previously, such sensors were constructed of relatively large and expensive electromagnetic and optical devices. More recently, micromechanical sensors have been fabricated using, semiconductor processing techniques. Microelectrical mechanical or "MEMS" systems allow formation of physical features using semiconductor materials and processing techniques. These techniques enable the physical features to have relatively small sizes and be more precise. Specifically, micromechanical accelerometers and gyroscopes have been formed from silicon wafers by using photolithographic and etching techniques. Such microfabricated sensors hold the promise of large scale production and therefore low cost.

In a vibratory gyroscope, the Coriolis effect induces energy transfer from the driver input vibratory mode to another mode which is sensed or output during rotation of the gyroscope. Silicon micromachined vibratory gyroscopes are integratable with silicon electronics. These devices are low cost, capable of achieving high Q factors, can withstand high g shocks due to their small masses, are insensitive to linear vibration and consume little power.

As the cost of manufacturing the vibratory gyroscopes decreases, other costs such as the cost of calibration of the gyroscope become a more significant portion of the total cost. Prior calibration using inertial testing required the use of a precision rotation table to perform various tumble and rotation maneuvers. What is desired is a system that calibrates a vibratory gyroscope at a significantly reduced cost.

SUMMARY

The present invention enables the simulation of the Coriolis forces with electrostatic elements already present in the vibratory gyroscope. For vibratory gyroscopes, the Coriolis force may be at the same frequency as the vibrational frequency of the gyroscope, which may be small in magnitude. An artificial electrostatic rotation signal is added to the closed-loop force rebalance system. Because the Coriolis force is at the same frequency as the artificial electrostatic force, the simulated force may be introduced into the system to perform an inertial test on MEMS vibratory gyroscopes without the use of a rotation table. Magnetic force, piezoelectric actuators or any other actuator used for vibratory gyroscopes may be used to introduce a simulated Coriolis force into the sensor.

DESCRIPTION OF DRAWINGS

These and other features and advantages of the invention will become more apparent upon reading the following detailed description and upon reference to the accompanying drawings.

FIG. 4 is a block diagram of a portion of the control circuitry of FIG. 1 according to one embodiment of the present invention.

DETAILED DESCRIPTION

Figure 1:
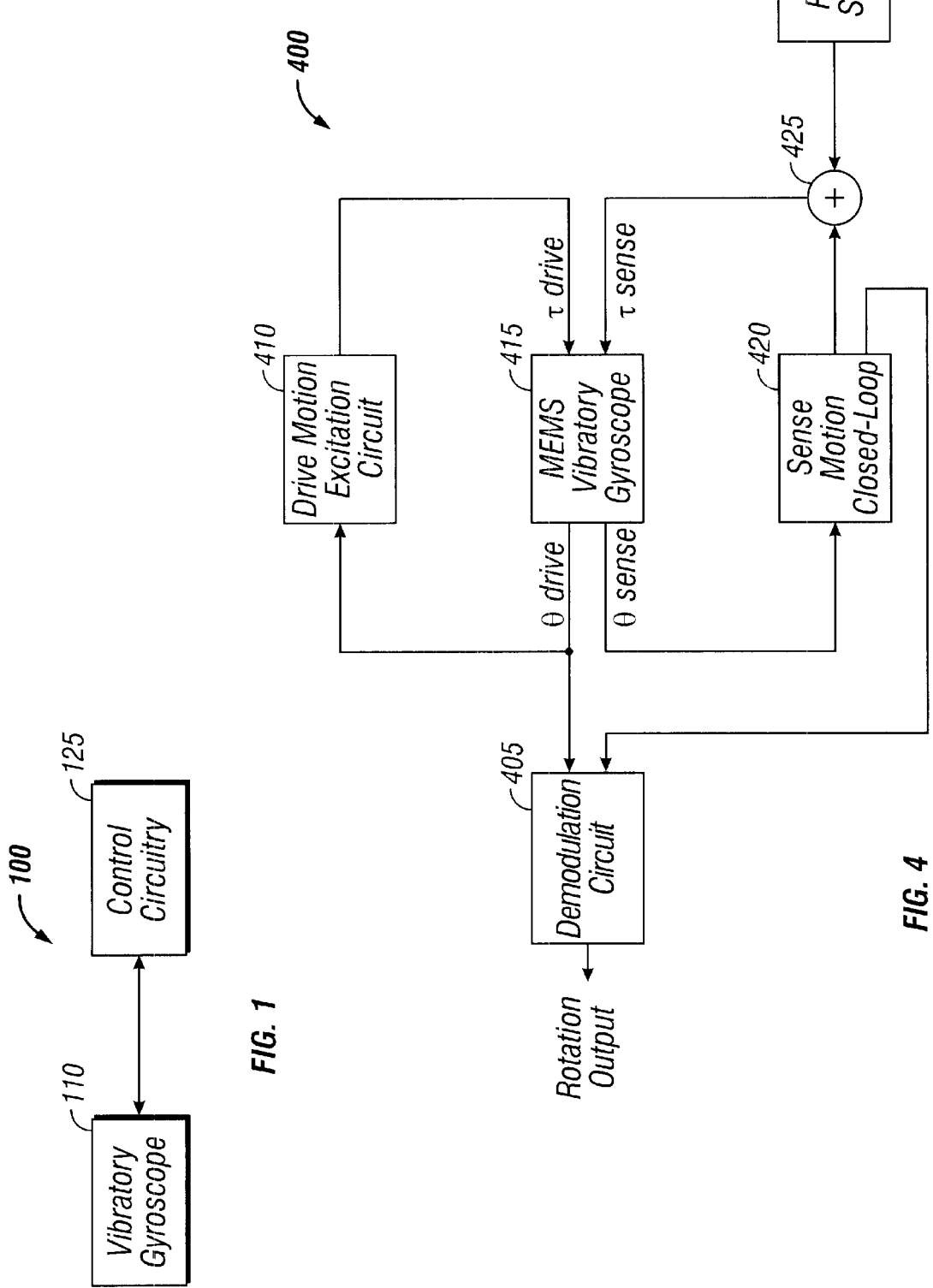
FIG. 1 is a block diagram of a microgyroscope system according to one embodiment of the present invention.

FIG. 1 is a block diagram of a microgyroscope system 100 according to one embodiment of the present invention. The microgyroscope system 100 includes a vibratory gyroscope 110 and associated control electronics 125. The control electronics 125 are typically included on a circuit board electrically connected to the vibratory gyroscope 110. The control electronics may be embodied in an application specific integrated circuit (ASIC).

Figure 2:
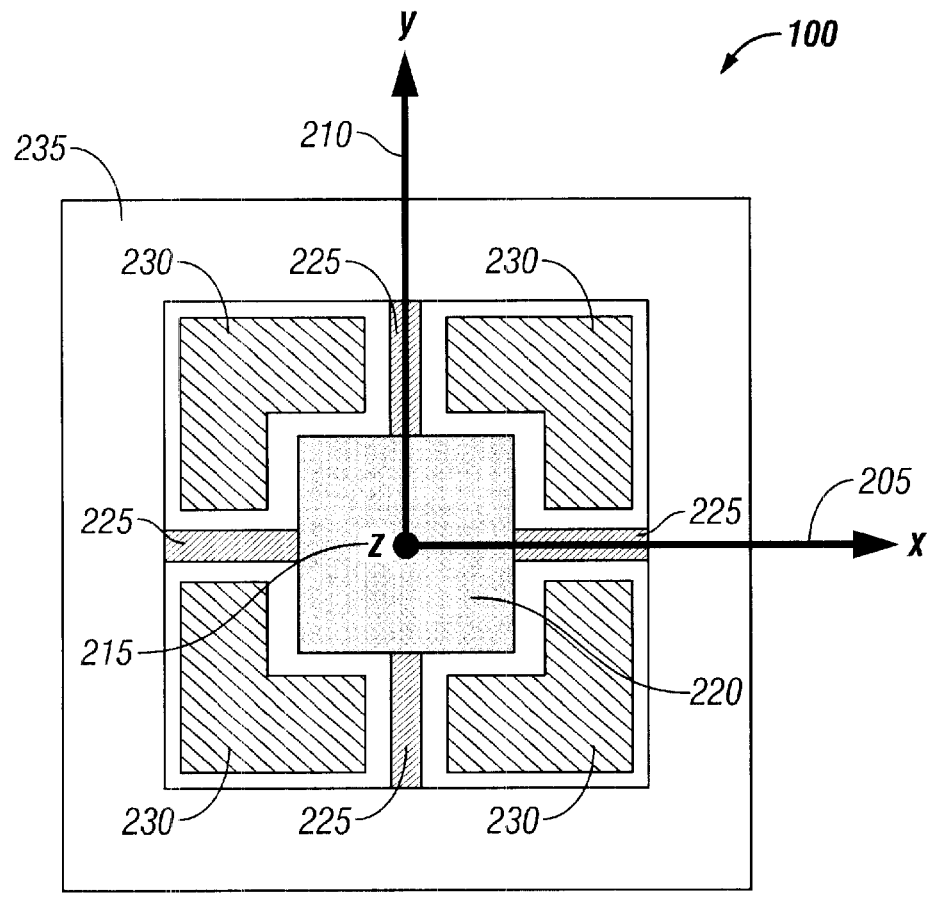
FIG. 2 is a top view of the microgyroscope of FIG. 1 according to one embodiment of the present invention.

FIG. 2 is a top view of a vibratory gyroscope 100 constructed according to one embodiment of the present invention. The vibratory gyroscope 100 detects forces in the x-direction 205, the y-direction 210, and in the z-direction 215. A vertical post 220 is supported by a plurality of silicon suspensions 225. The suspensions 225 connect the vertical post 220 to a frame 235. Although suspensions 225 are shown connecting the vertical post 220 to the frame 235, it can be appreciated that the vibratory gyroscope 100 may be constructed without the use of suspensions without departing from the spirit of the invention.

Vertical capacitors 230 surround the vertical post 220. The vertical capacitors 230 provide electrostatic actuation of the vertical post 220 and allow for capacitive detection of the motions of the vertical post 220. The vertical capacitors 230 are positioned to allow the suspensions 225 to connect the vertical post 220 to the frame 235.

Figure 3:
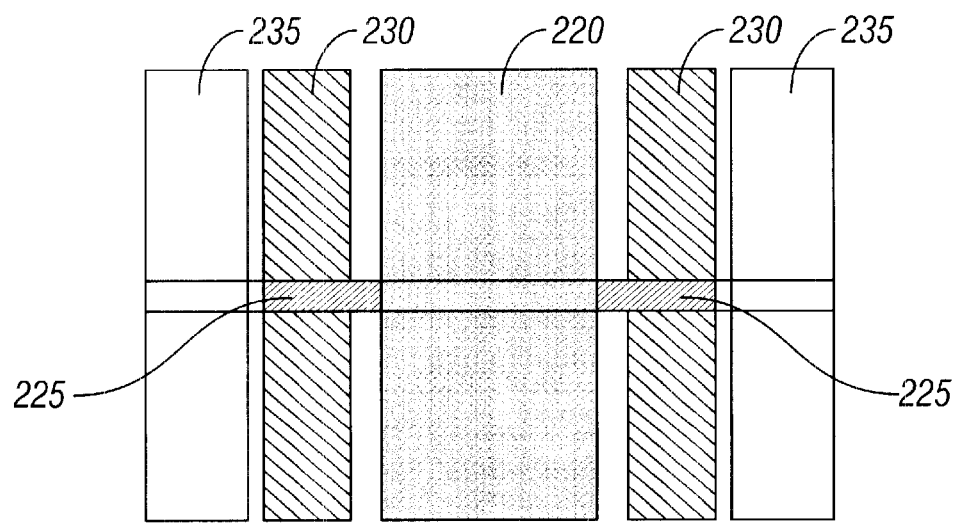
FIG. 3 is a side view of the microgyroscope of FIG. 1 according to one embodiment of the present invention.

FIG. 3 shows a side view of the vibratory gyroscope 100 according to one embodiment of the present invention. The vertical post 220 is connected to the frame 235 via the silicon suspensions 225. As can be seen in FIG. 3, the silicon suspensions 225 are positioned at approximately the midpoint of the vertical post 220. Because the vertical post 220 is connected to the frame 235 via the suspensions 225 at approximately the mid-point, the vertical post 220 is free to move in a rocking motion in the x-direction 205 and the y-direction 210. Under input rotation, the Coriolis force causes the vertical post 220 to move in the orthogonal direction to the drive motor. The rotation rate sensitivity is proportional to the input-rotation rate, the drive amplitude, and the quality factor of the resonator.

FIG. 4 is a block diagram of the rotation detection and calibration loop 400 of the control electronics 125 for the vibratory gyroscope system according to one embodiment of the invention. The rotation detection and calibration loop 400 includes a demodulation circuit 405, a drive motion excitation circuit 410, a MEMS vibratory gyroscope 415, a sense motion closed-loop 420, a signal adder 425, and a rotation simulator 430.

The drive motion excitation circuit 410 measures the drive motion and provides an excitation force (τ drive) to the vibratory gyroscope 415 to sustain a constant vibratory motion. The excitation force (τ drive) resonates the gyroscope 415 along one axis at a predetermined motion. The gyroscope 415 then provides a drive signal (θ drive) representative of the motion in the drive resonance. The drive signal (θ drive) is fed back to the drive motion excitation circuit 410 and is also provided to the demodulation circuit 405.

The gyroscope 415 also provides a sense signal (q sense) to the sense motion closed-loop 420. The sense signal (q sense) represents the motion of the gyroscope in the sense direction. The sense motion closed-loop 420 provides electrical damping of the sense motion of the gyroscope. Thus, the sense motion closed-loop 420 detects the sense motion and generates an output signal (negative feedback signal) to null any motion of Coriolis force from the gyroscope 415. This output signal is provided to the signal adder 425. If no rotation simulation signal is provided, the output signal would be the sense force (t sense) provided to the gyroscope 415. The output signal from the sense motion close-loop 420 is also provided to the demodulation circuit 405.

The rotation simulator 430 generates a rotation signal which is supplied to the signal adder 425. The rotation signal is an electrostatic force designed to simulate the Coriolis forces that may act on the gyroscope 415. The rotation signal generated by the rotation simulator 430 is at the same phase and frequency as the Coriolis forces. The rotation simulator 430 is capable of generating a rotation signal which can simulate any motion of the gyroscope 415.

The signal adder 425 combines the rotation signal with the output signal from the sense motion closed-loop 420 to create the sense force (τ sense) provided to the gyroscope 415. The sense force (τ sense) is then rebalanced by the sense motion closed-loop 420 as if the rotation signal were an actual rotation force.

The demodulation circuit 405 receives the output signal from the sense motion closed-loop and the drive signal (θ drive) from the gyroscope 415. The demodulation circuit 405 demodulates these signals to generate a rotation output signal. The rotation output signal is proportional to the simulated Coriolis force generated by the rotation simulator 430. Thus, the gyroscope 415 may be calibrated without the use of a rotation table. Of course, the present system may be used with a single gyroscope 415 or with a complete three-axis system.

Numerous variations and modifications of the invention will become readily apparent to those skilled in the art. Accordingly, the invention may be embodied in other specific forms without departing from its spirit or essential characteristics.

What is claimed is:

1. A method of calibrating a vibratory gyroscope comprising:

introducing a simulated rotation signal to the gyroscope;

detecting a sense motion created by the rotation signal;

combining a sense motion correction signal with the simulated rotation signal.

2. The method of claim 1, further comprising demodulating the sense motion correction signal to determine the detected motion.

3. The method of claim 1, further comprising driving the gyroscope along a single axis.

4. The method of claim 1, wherein the simulated rotation signal is at a same phase and frequency as a natural Coriolis force of the vibratory gyroscope.

5. The method of claim 1, further comprising generating the simulated rotation signal with a vertical capacitor.

6. A method of calibrating a vibratory gyroscope comprising:

driving a single axis of the gyroscope;

sensing a motion in a sense resonance;

adding an electronic rotation signal to a sense force motion correction signal; and determining a change in the motion in the sense resonance due to the rotation signal.

7. The method of claim 6, further comprising generating a signal representative of the motion in the sense resonance.

8. The method of claim 7, further comprising demodulating the signal representative of the motion in the sense resonance.

9. The method of claim 6, wherein the electronic rotation signal is at a same phase and frequency as a natural Coriolis force.

10. The method of claim 6, further comprising calculating an error signal from the change in the motion in the sense resonance due to the rotation signal.

11. The method of claim 6, further comprising generating the electronic rotation signal with a vertical capacitor.

12. A calibration system for a vibratory gyroscope comprising:

a drive motion excitation circuit which drives the gyroscope;

a sense motion detector which determines a motion of the vibratory gyroscope in a sense direction; and a rotation simulator which generates a rotation signal to simulate natural Coriolis forces of the vibratory gyroscope, the rotation signal being applied to the vibratory gyroscope.

13. The calibration system of claim 12, wherein the sense motion detector generates a signal representative of the motion in the sense direction.

14. The calibration system of claim 12, further comprising a demodulation circuit which demodulates the signal representative of the motion in the sense direction.

15. The calibration system of claim 12, wherein the rotation signal has a same phase and frequency as the natural Coriolis forces.

16. The calibration system of claim 12, further comprising a signal adder to combine the signal representative of the motion in the sense direction with the rotation signal.

17. The calibration system of claim 12, wherein the drive motion excitation circuit drives the gyroscope along a single axis.

18. The calibration system of claim 12, wherein the gyroscope is a MEMS vibratory gyroscope.

* * * * *